US011523691B1

(12) United States Patent
Lai et al.

(10) Patent No.: US 11,523,691 B1
(45) Date of Patent: Dec. 13, 2022

(54) INFANT DINING CHAIR

(71) Applicant: TUNG TZU INDUSTRIAL CO., LTD., Tainan (TW)

(72) Inventors: Chin-I Lai, Tainan (TW); Kung-Yin Lai, Tainan (TW)

(73) Assignee: TUNG TZU INDUSTRIAL CO., LTD., Tainan (TW)

( * ) Notice: Subject to any disclaimer, the term of this patent is extended or adjusted under 35 U.S.C. 154(b) by 0 days.

(21) Appl. No.: 17/386,704

(22) Filed: Jul. 28, 2021

(51) Int. Cl.
| A47D 1/00 | (2006.01) |
| A47D 1/02 | (2006.01) |
| A47D 1/04 | (2006.01) |
| A47D 1/10 | (2006.01) |
| F16B 7/04 | (2006.01) |

(52) U.S. Cl.
CPC ............. *A47D 1/008* (2013.01); *A47D 1/002* (2013.01); *A47D 1/004* (2013.01); *A47D 1/023* (2017.05); *A47D 1/04* (2013.01); *A47D 1/103* (2013.01); *F16B 7/042* (2013.01); *Y10T 403/32467* (2015.01)

(58) Field of Classification Search
None
See application file for complete search history.

(56) References Cited

U.S. PATENT DOCUMENTS

| 3,864,048 A * | 2/1975 | Parker | F16B 7/105 |
| | | | 403/328 |
| 6,920,834 B1* | 7/2005 | Pehta | A47B 9/14 |
| | | | 248/188.5 |
| 8,286,926 B1* | 10/2012 | Van Dyne | F16M 11/32 |
| | | | 248/165 |
| 10,413,077 B2* | 9/2019 | Freelend | A47B 9/14 |
| 2004/0231939 A1* | 11/2004 | Miyoshi | B62B 5/085 |
| | | | 16/113.1 |
| 2012/0104810 A1* | 5/2012 | Walsh | B62K 19/36 |
| | | | 297/215.13 |
| 2012/0235454 A1* | 9/2012 | Geismar | A47C 3/26 |
| | | | 297/239 |
| 2021/0262187 A1* | 8/2021 | Curry | E02B 17/0004 |

* cited by examiner

*Primary Examiner* — David E Allred
(74) *Attorney, Agent, or Firm* — Muncy, Geissler, Olds & Lowe, P.C.

(57) ABSTRACT

The invention provides an improved infant dining chair including a seat unit, a dining table unit, two front chair leg adjusting units, a front chair leg unit, two rear chair leg adjusting units and a rear chair leg unit. The seat unit is pivoted with two front and two rear connecting pipe bodies, and the dining table unit. Each of the connecting pipe bodies is sleeved with one of the chair leg adjusting units. The chair leg unit is provided with two front supporting pipe bodies including a plurality of height adjusting holes. Each of the front elastic positioners is engaged in one of the front height adjusting holes, and each of the rear elastic positioners is engaged in one of the rear height adjusting holes.

9 Claims, 9 Drawing Sheets

INFANT DINING CHAIR

FIELD OF THE INVENTION

The present invention relates to an infant dining chair, in particular to an improved infant dining chair of which the height is convenient to adjust.

BACKGROUND OF THE INVENTION

In current restaurants, infant dining chairs, which are mainly used for providing convenience and a safe environment for parents to feed infants, are required to be prepared for infants. However, infant dining chairs are provided for the general public, some consideration has to be given in terms of sanitation of such dining chairs. Some parents will carry their own simple and portable infant dining chairs which can be arranged on chairs so as to be used by their infants. However, the heights of most of such infant dining chairs cannot be adjusted as required. Therefore, it is necessary for infant dining chairs to be conveniently adjusted the heights.

SUMMARY OF THE INVENTION

A purpose of the invention is to provide an improved infant dining chair of which the height is able to be adjusted as required.

In order to achieve the above-mentioned purpose, the invention provides an improved infant dining chair which is provided for an infant to seat. The infant dining chair includes a seat unit, a dining table unit, two front chair leg adjusting units, a front chair leg unit, two rear chair leg adjusting units and a rear chair leg unit. The seat unit includes two chair leg connecting units pivoted on two sides of the seat unit, wherein each of the two chair leg connecting units includes a front connecting pipe body and a rear connecting pipe body, one end of the front connecting pipe body and one end of the rear connecting pipe body are pivoted to a pivoting member, the other end of the front connecting pipe body is provided with a front through hole, and the other end of the rear connecting pipe body is provided with a rear through hole. The dining table unit is pivoted to the pivoting member of each of the two chair leg connecting units. Each of the front chair leg adjusting units is connected to one end of the front connecting pipe body provided with the front through hole, wherein each of the two front chair leg adjusting units includes a front connecting piece sleeving an inner side wall of the end of the front connecting pipe body provided with the front through hole, and a front positioning elastic piece sleeving an inner side wall of the front connecting piece, and wherein a side wall of the front connecting piece is provided with a front elastic positioner and a front positioning hole located opposite to the front elastic positioner, one side of the front positioning elastic piece is abutted with the front elastic positioner correspondingly, and another side of the front positioning elastic piece is bent and includes a front limiting convex column engaged in the front positioning hole. The front chair leg unit is provided with two front supporting pipe bodies respectively assembled on the corresponding front connecting piece, wherein each of the two front supporting pipe bodies is provided with at least one front height adjusting hole. Each of the rear chair leg adjusting units is connected to one end of the rear connecting pipe body provided with the rear through hole, wherein each of the two rear chair leg adjusting units includes a rear connecting piece sleeving an inner side wall of the end of the rear connecting pipe body provided with the rear through hole, and a rear positioning elastic piece sleeving an inner side wall of the rear connecting piece, and wherein a side wall of the rear connecting piece is provided with a rear elastic positioner and a rear positioning hole located opposite to the rear elastic positioner, one side of the rear positioning elastic piece is abutted with the rear elastic positioner correspondingly, and another side of the front positioning elastic piece is bent and includes a rear limiting convex column engaged in the rear positioning hole. The rear chair leg unit is provided with two rear supporting pipe bodies respectively assembled on the corresponding rear connecting piece, wherein each of the two rear supporting pipe bodies is provided with at least one rear height adjusting hole. Each front elastic positioner is engaged in one of the at least one front height adjusting hole, and each rear elastic positioner is engaged in one of the at least one rear height adjusting hole.

In one embodiment, each front supporting pipe body is provided with a front positioning sliding chute on an inner side wall opposite to the at least one front height adjusting hole, and each rear supporting pipe body is provided with a rear positioning sliding chute on an inner side wall opposite to the at least one rear height adjusting hole.

In one embodiment, each of the two front supporting pipe bodies is convexly provided with a front positioning convex block, and each of the two rear supporting pipe bodies is convexly provided with a rear positioning convex block, and wherein the front positioning convex block is engaged in one of the at least one front height adjusting hole, and the rear positioning convex block is engaged in one of the at least one rear height adjusting hole.

In one embodiment, each of the at least one front height adjusting hole is provided with a front pushing piece, and each of the at least one rear height adjusting hole is provided with a rear pushing piece.

In one embodiment, a front leg seat is assembled between the front supporting pipe bodies, and a rear leg seat is assembled between the rear supporting pipe bodies.

In one embodiment, the seat unit includes a seat and a backrest pivoted to one end of the seat, and the chair leg connecting units are respectively pivoted between the seat and the backrest.

Therefore, compared with the prior art, the invention includes the benefits that due to the design of the front chair leg adjusting units and the rear chair leg adjusting units of the improved infant dining chair of the invention, when a user wants to adjust the height of the infant dining chair, the user simply presses the front pushing pieces pushed by the front elastic positioners and the rear pushing pieces pushed by the rear elastic positioners downwards, so that the front elastic positioners will not be engaged in the front height adjusting holes, and the rear elastic positioners will not be engaged in the rear height adjusting holes. As the elastic positioners are adjusted to appropriate heights one by one, the front pushing pieces and the rear pushing pieces are released. Then, the front elastic positioners and the rear elastic positioners are engaged in the corresponding front height adjusting holes and rear height adjusting holes, which is convenient for the user to adjust the height of the infant dining chair.

DETAILED DESCRIPTION OF THE PREFERRED EMBODIMENTS

Several preferred embodiments of the present invention are described below in conjunction with the drawings. The embodiments are merely intended to describe technical contents of the present invention, rather than to limit the scope desired to be protected by the present invention.

Figure 1:
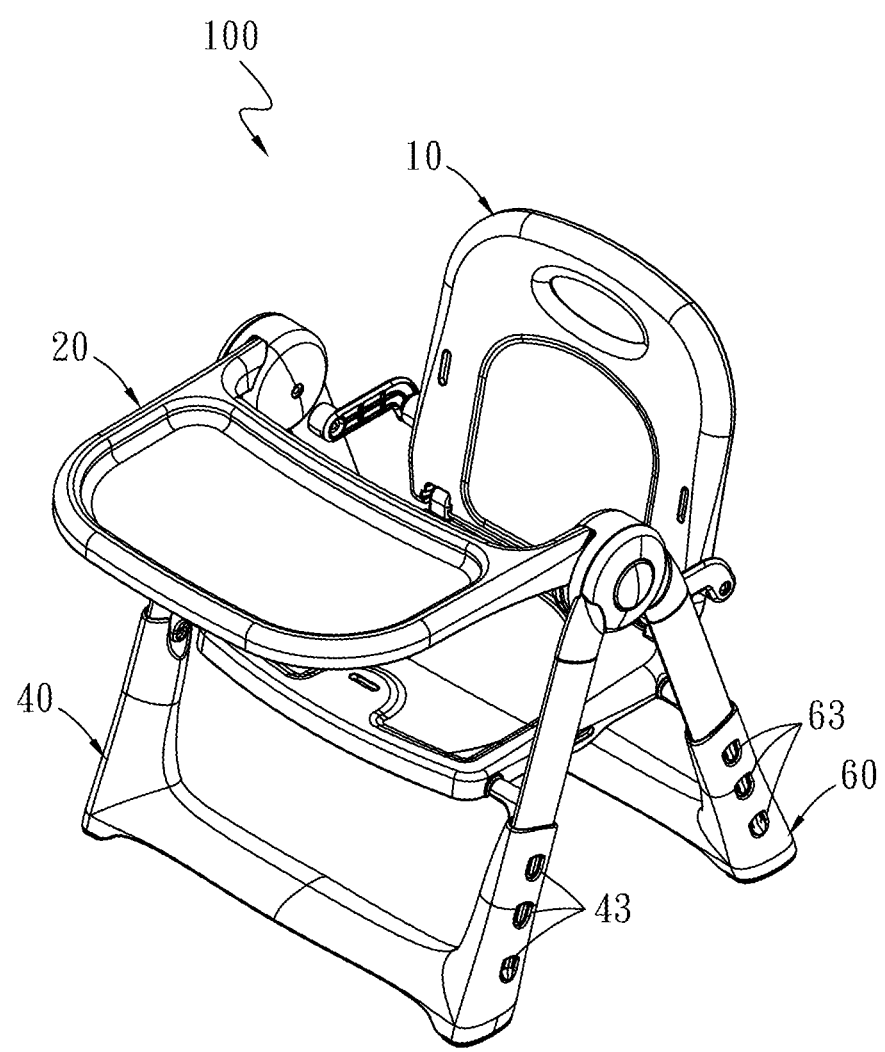
FIG. 1 is a schematic perspective view showing an infant dining chair of the invention.
Figure 2:
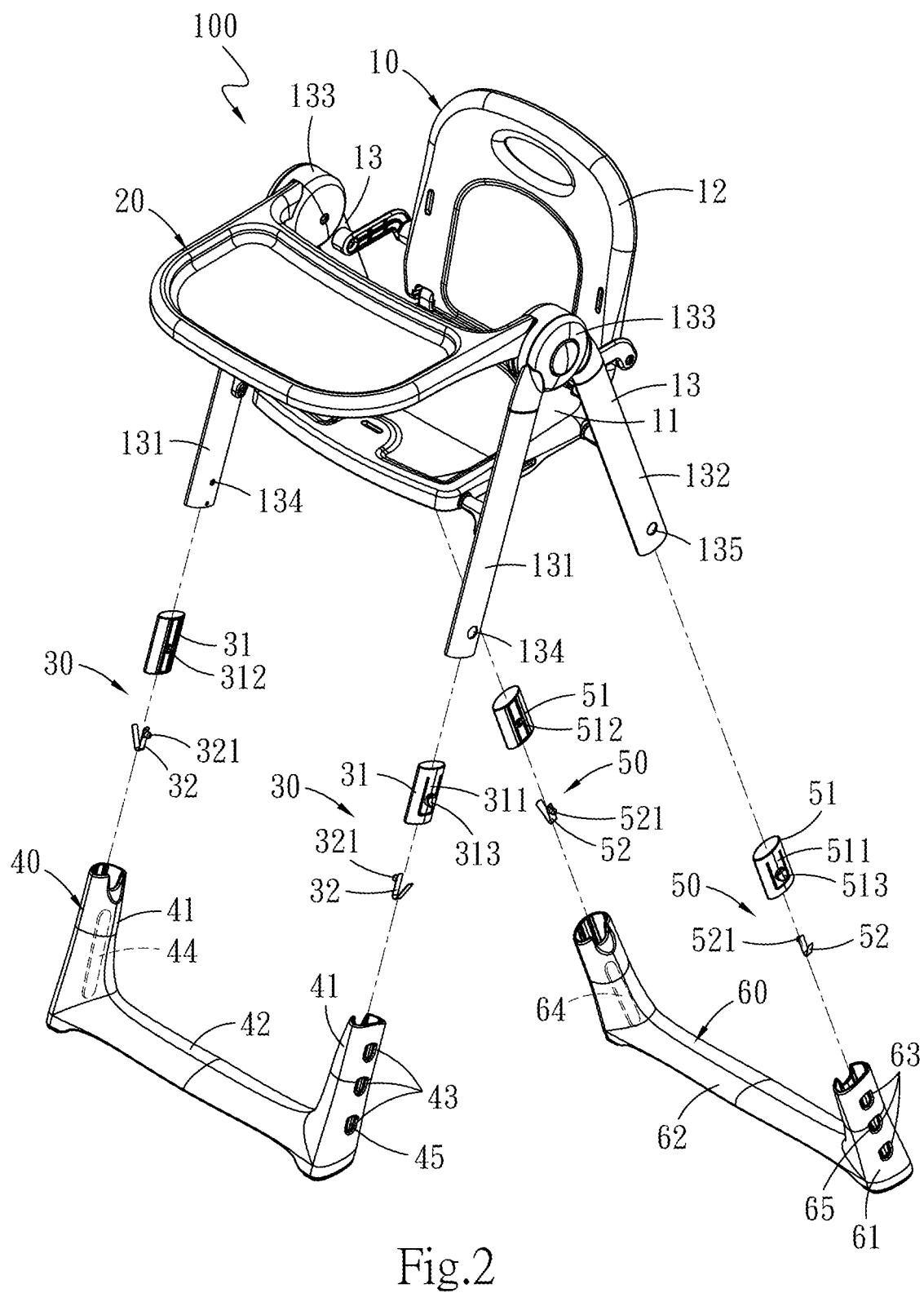
FIG. 2 is a breakdown illustration showing the infant dining chair of the invention.

Please refer to FIG. 1 and FIG. 2, the present invention provides an improved structure of an infant dining chair 100 provided for an infant to seat. The infant dining chair 100 includes a seat unit 10, a dining table unit 20, two front chair leg adjusting units 30, a front chair leg unit 40, two rear chair leg adjusting units 50, and a rear chair leg unit 60.

Figure 6:
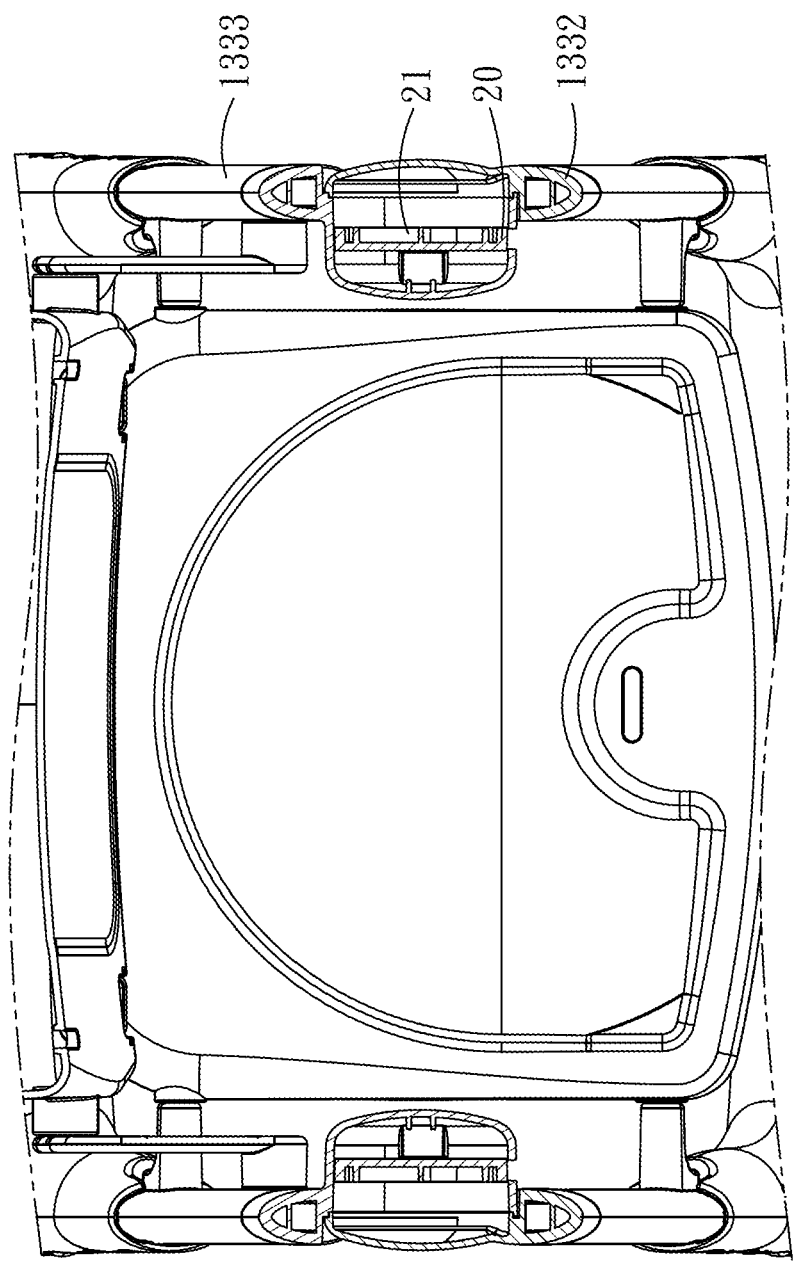
FIG. 6 is a schematic view showing a partial section view of a pivoting member of the invention.
Figure 7:
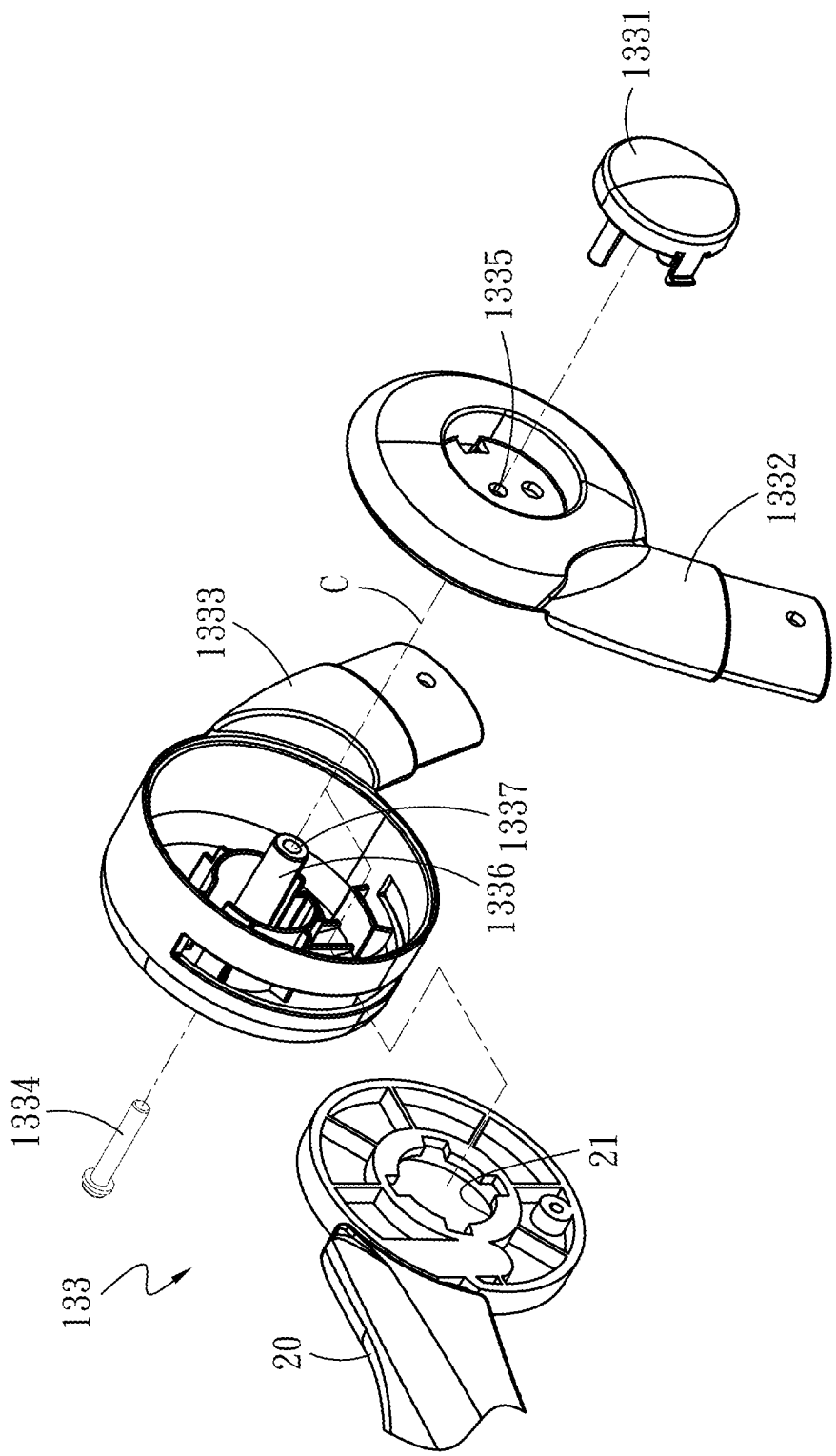
FIG. 7 is a partial exploded view of the pivoting member of the invention.

The seat unit 10 includes a seat 11 and a backrest 12 pivoted to one end of the seat 11, and each of two sides of the seat unit 10 is pivoted with a chair leg connecting unit 13 which is provided between the seat 11 and the backrest 12, wherein each of the chair leg connecting units 13 is provided with a front connecting pipe body 131 and a rear connecting pipe body 132. One end of the front connecting pipe body 131 and one end of the rear connecting pipe body 132 are pivoted to a pivoting member 133, the other end of the front connecting pipe body 131 is provided with a front through hole 134, and the other end of the rear connecting pipe body 132 is provided with a rear through hole 135. Please refer to FIG. 6 and FIG. 7, each of the pivoting members 133 includes a first buckle 1331, a front connecting pipe pivot 1332, a rear connecting pipe pivot 1333 and a second buckle 1334. One end of the front connecting pipe pivot 1332 is provided with a first pivoting through hole 1335. One end of the rear connecting pipe pivot 1333 is provided with a pivoting axis 1336 parallel to an axial direction of the rear connecting pipe pivot 1333 and a second pivoting through hole 1337 penetrating through the pivoting axis 1336. The second buckle 1334 penetrates into the second pivoting through hole 1337 and is assembled in the first pivoting through hole 1335, and when the first buckle 1331 and the second buckle 1334 are assembled, the front connecting pipe pivot 1332 and the rear connecting pipe pivot 1333 are assembled between the first buckle 1331 and the second buckle 1334; and the pivoting axis 1336 in this embodiment is pivoted to the first pivoting through hole 1335.

The dining table unit 20 is pivoted to the pivoting members 133 of the two chair leg connecting units, and each side of the dining table unit 20, which is pivoted to the pivoting member 133, is provided with a third pivoting through hole 21, wherein each third pivoting through hole 21 is assembled in the first buckle 1331.

Figure 3A:
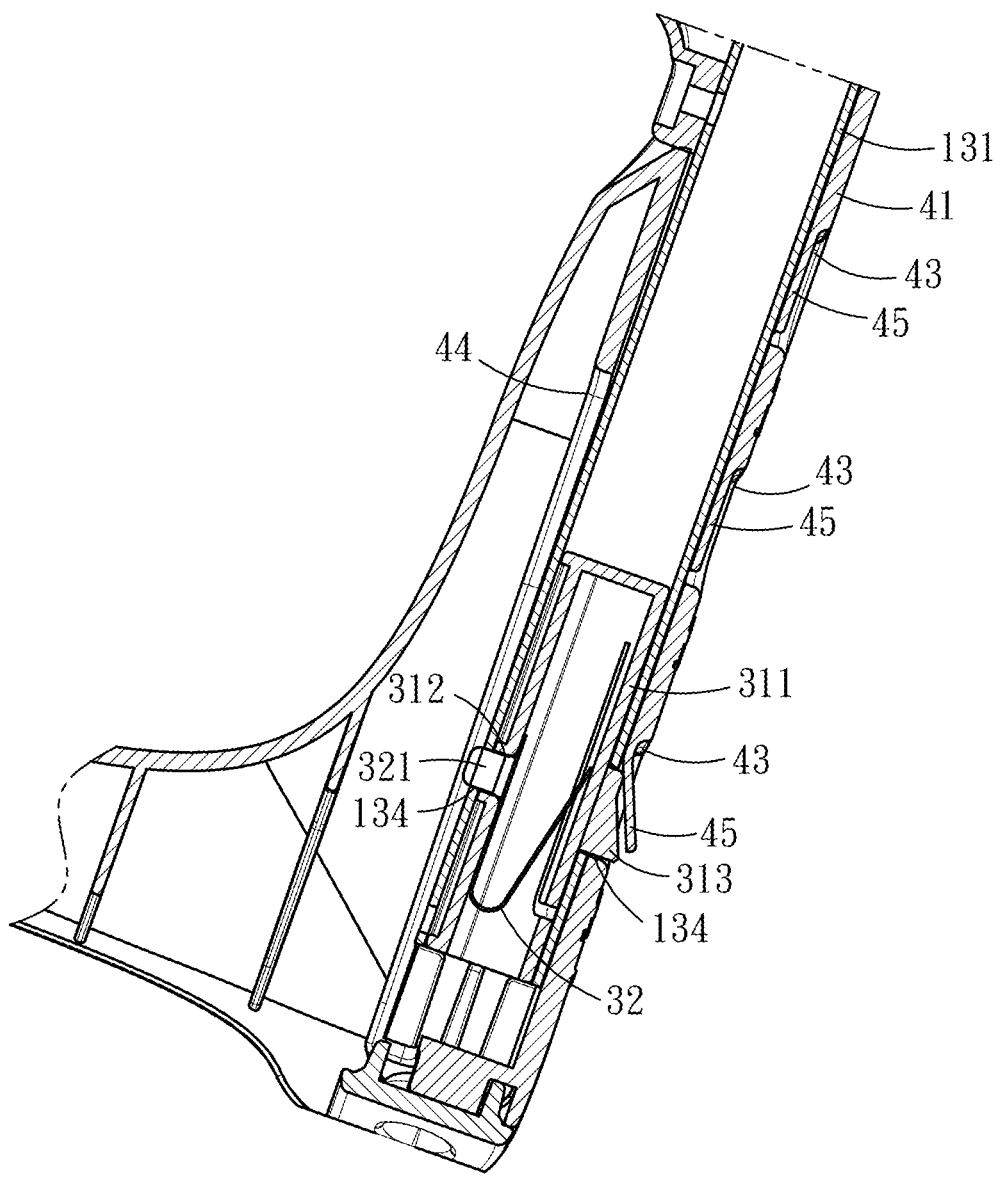
FIG. 3A is a schematic view each of front chair leg adjusting units of the invention at a locking state.
Figure 3B:
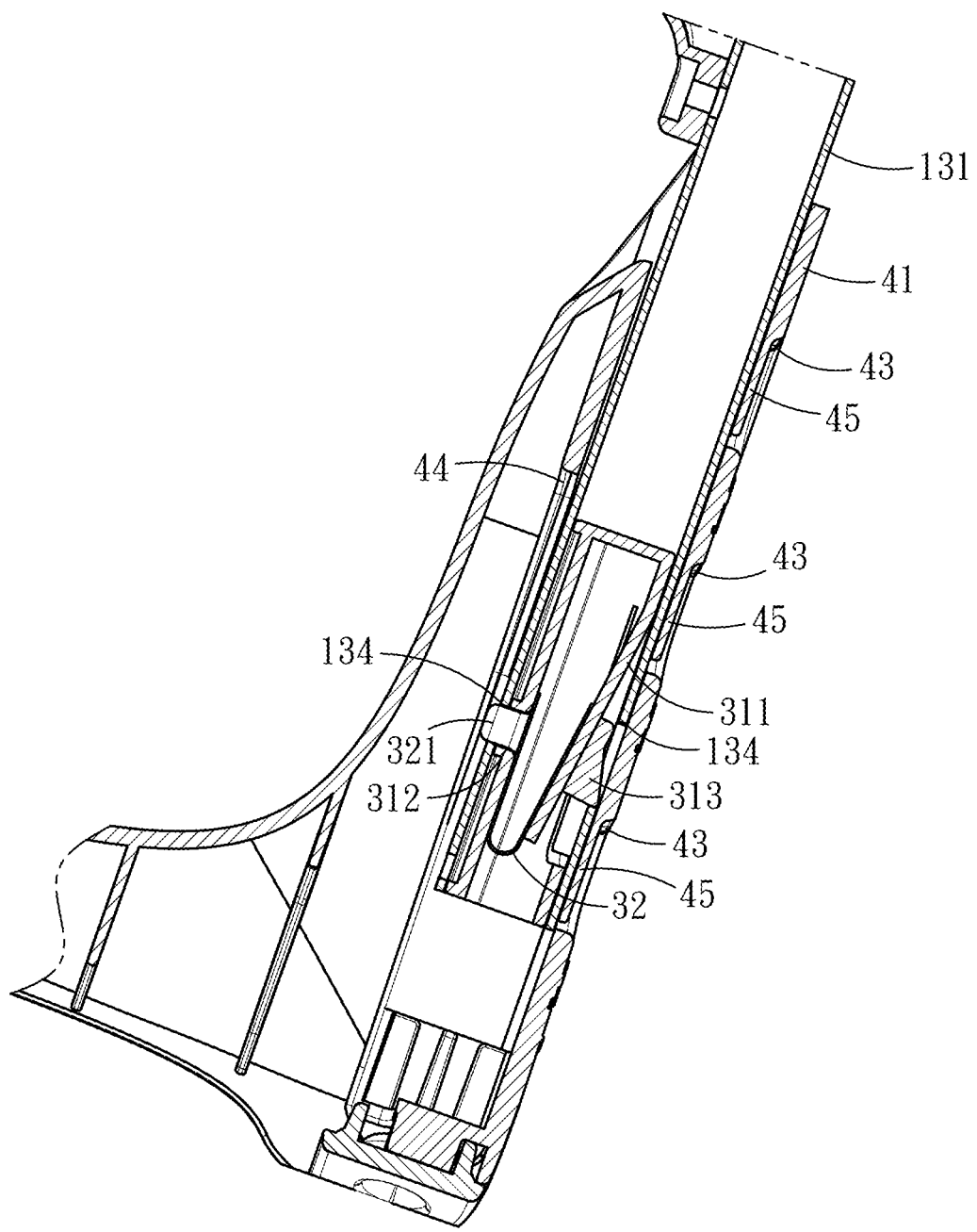
FIG. 3B is a schematic view of each of the front chair leg adjusting units of the invention at an adjusting state.
Figure 4A:
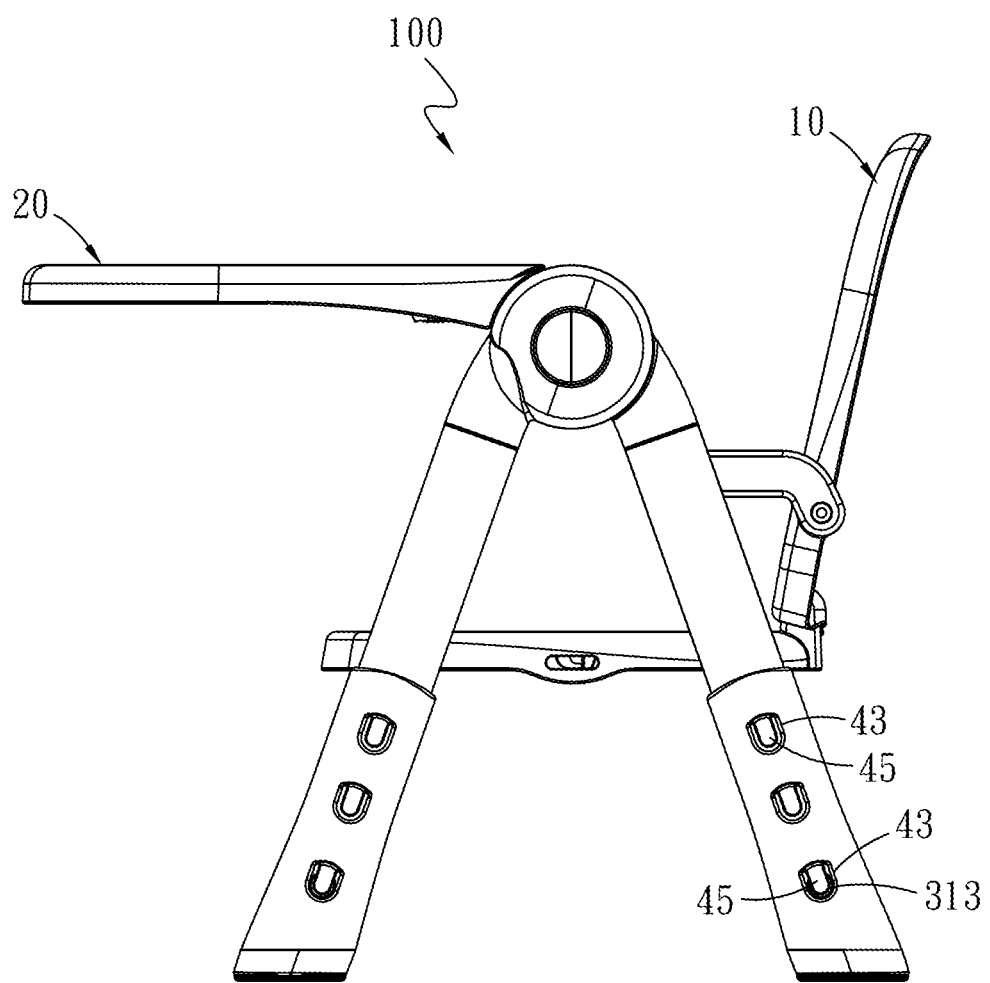
FIG. 4A is a schematic view of a seat unit of the invention before the height thereof is adjusted.
Figure 4B:
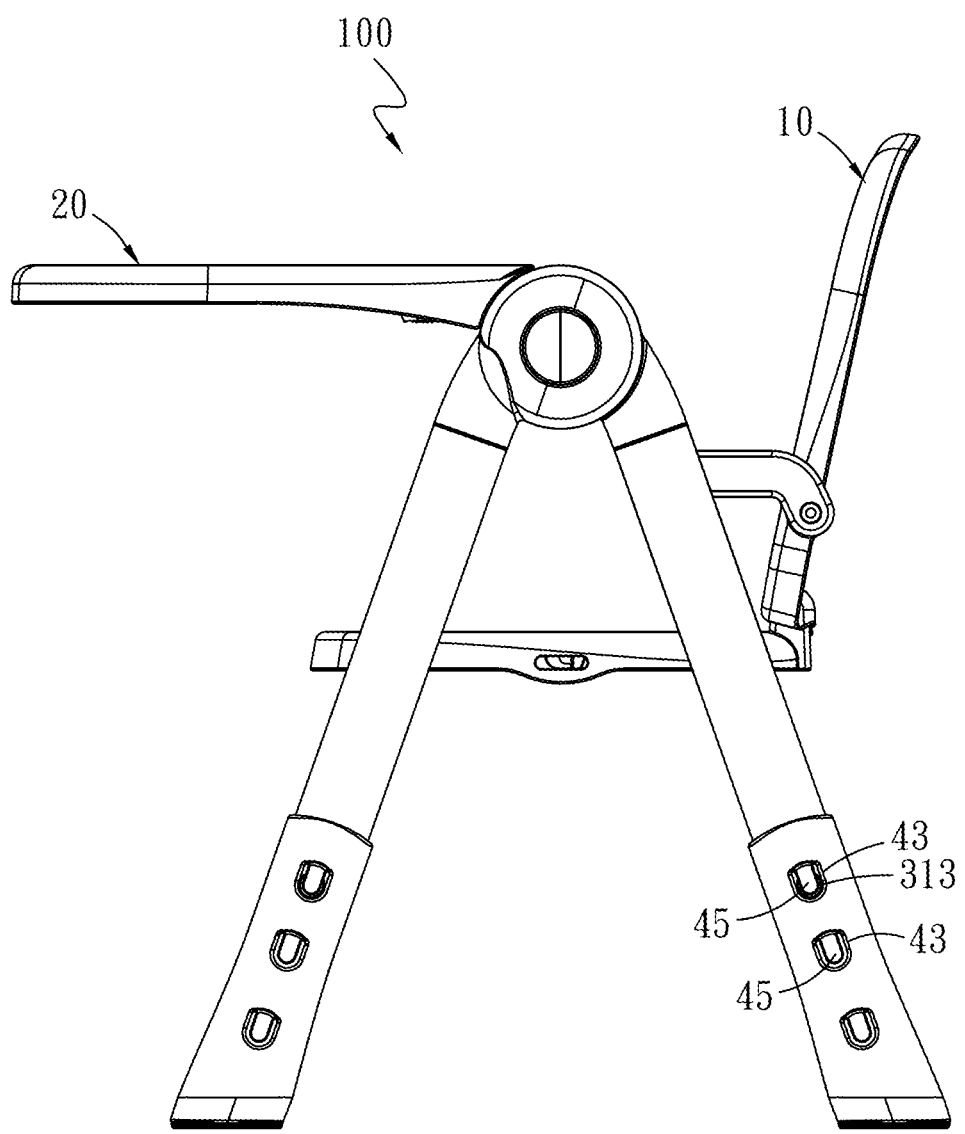
FIG. 4B is a schematic view of the seat unit of the invention after the height thereof is adjusted.
Figure 5:
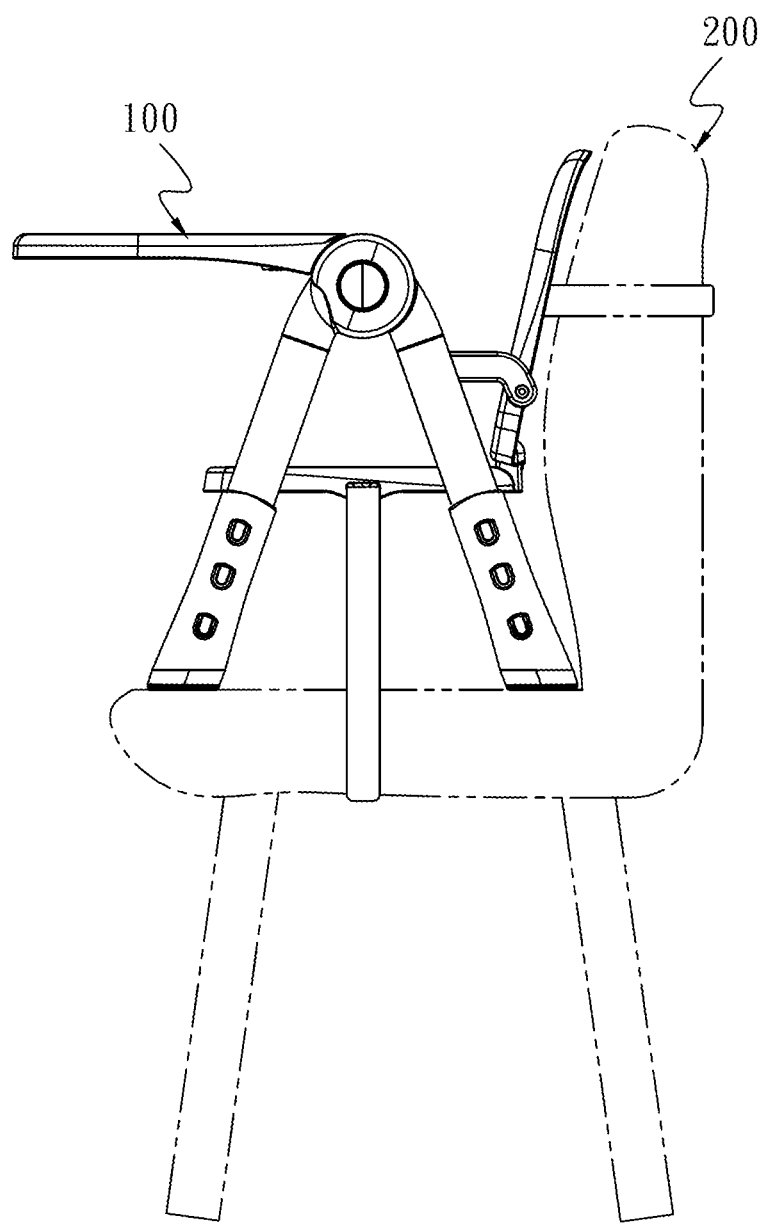
FIG. 5 is a schematic view showing that the seat unit of the invention is arranged on a chair.

Each of the two front chair leg adjusting units 30 is connected to one end of the front connecting pipe body 131 provided with the front through hole 134. Each of the two front chair leg adjusting units 30 includes a front connecting piece 31 and a front positioning elastic piece 32, wherein the front connecting piece 31 sleeve an inner side wall of the end of the front connecting pipe body 131 provided with the front through hole 134, and the front positioning elastic piece 32 sleeve an inner side wall of the front connecting piece 31. Please refer to FIG. 3A and FIG. 3B together with FIG. 2, a side wall of each front connecting piece 31 is provided with a front elastic positioner 311 and a front positioning hole 312 located opposite to the front elastic positioner 311. One side of each front positioning elastic piece 32 is abutted with the front elastic positioner 311 correspondingly, and another side of each front positioning elastic piece 32 is bent and includes a front limiting convex column 321 engaged in the front positioning hole 312. Each front elastic positioner 311 is convexly provided with a front positioning convex block 313. As the two front chair leg adjusting units 30 are sleeved in the front connecting pipe bodies 131 correspondingly, and each front positioning convex block 313 and each front limiting convex column 321 are respectively engaged in two sides of the front through hole 134.

The front chair leg unit 40 includes two front supporting pipe bodies 41 and a front leg seat 42 arranged between the front supporting pipe bodies 41, wherein each of the two front supporting pipe bodies 41 is assembled in one of the corresponding front connecting pieces 31. Please refer to FIG. 3A and FIG. 3B, each front supporting pipe body 41 is provided with three front height adjusting holes 43, and each front supporting pipe body 41 is provided with a front positioning sliding chute 44 on an inner side wall opposite to the front height adjusting holes 43. Each front height adjusting hole 43 is provided with a front pushing piece 45.

Each of the two rear chair leg adjusting units 50 is connected to one end of the rear connecting pipe body 132 provided with the rear through hole 135. Each of the two rear chair leg adjusting units 50 includes a rear connecting piece 51 and a rear positioning elastic piece 52, wherein the rear connecting piece 51 sleeve an inner side wall of the end of the rear connecting pipe body 132 provided with the rear through hole 135, and the rear positioning elastic piece 52 sleeve an inner side wall of the rear connecting piece 51. A side wall of each rear connecting piece 51 is provided with a rear elastic positioner 511 and a rear positioning hole 512 located opposite to the rear elastic positioner 511. One side of each rear positioning elastic piece 52 is abutted with the rear elastic positioners 511 correspondingly, the other side of each rear positioning elastic piece 52 is bent and includes a rear limiting convex column 521 engaged in the rear positioning hole 512. Each rear elastic positioner 511 is convexly provided with a rear positioning convex block 513. As the rear chair leg adjusting units 50 are sleeved in the rear connecting pipe bodies 132 correspondingly, and each rear positioning convex block 513 and each rear limiting convex column 521 are respectively engaged in two sides of the rear through hole 135.

The rear chair leg unit 60 includes two rear supporting pipe bodies 61 and a rear leg seat 62 arranged between the rear supporting pipe bodies 61, wherein each of the two rear supporting pipe bodies 61 is assembled in one of the corresponding rear connecting pieces 51. Each rear supporting pipe body 61 is provided with three rear height adjusting holes 63, and each rear supporting pipe body 61 is provided with a rear positioning sliding chute 64 on an inner side wall opposite to the rear height adjusting holes 63. Each rear height adjusting hole 63 is provided with a rear pushing piece 65.

Each front positioning convex block 313 is engaged in one of the two front height adjusting holes 43 and is abutted with one of the front pushing pieces 45. Each rear positioning convex block 513 is engaged in one of the two rear height adjusting holes 63 and is abutted with one of the rear pushing pieces 65.

Each third pivoting through hole 21 is assembled in the rear connecting pipe pivot 1333 and is configured to accommodate the pivoting axis 1336, and therefore, the front connecting pipe body 131 assembled on the front connecting pipe pivot 1332 and the rear connecting pipe body 132 assembled on the rear connecting pipe pivots 1333 are pivoted via the pivoting member 133. The front connecting pipe body 131 and the rear connecting pipe body 132 may be unfolded to be approximately parallel with the same axis.

Please refer to FIG. 3A, FIG. 3B, FIG. 4A, FIG. 4B, and FIG. 5, in one embodiment, a user may respectively engage the front positioning convex blocks 313 of the front chair leg adjusting units 30 in the front height adjusting holes 43 on lower positions of the infant dining chair 100, then the front pushing pieces 45 would be pushed outward by the front positioning convex blocks 313 which are engaged. The rear chair leg adjusting units 50 are also adjusted and fixed in a way which is the same as that of the front chair leg adjusting units 30. After heights of the front chair leg unit 40 and the rear chair leg unit 60 are both fixed, the user places the infant dining chair 100 on a chair 200. Please refer to FIG. 3B and FIG. 4B, in one embodiment, as the user places the infant dining chair 100 on the ground or adjusts the height of the infant dining chair 100, the user may press the front pushing pieces 45 which are pushed outward to make the front chair leg adjusting units 30 slide in the front connecting pipe bodies 131 and the front limiting convex columns 321 slide along the front positioning sliding chutes 44 correspondingly. After the positions of the front supporting pipe bodies 41 and the front connecting pipe bodies 131 are adjusted, the front positioning convex blocks 313 which are abutted with the front positioning elastic pieces 32 engage into the corresponding front height adjusting holes 43 by elasticity. As the front pushing pieces 45 are pushed, the front chair leg unit 40 is engaged and fixed on the front connecting pipe bodies 131. In addition, the user may press the rear pushing pieces 65 which are pushed outward to make the rear chair leg adjusting units 50 slide in the rear connecting pipe bodies 132 and the rear limiting convex columns 521 slide along the rear positioning sliding chutes 64 correspondingly. After the positions of the rear supporting pipe bodies 61 and the rear connecting pipe bodies 132 are adjusted, the rear positioning convex blocks 513 which are abutted with the rear positioning elastic pieces 52 engage into the corresponding rear height adjusting holes 63 by elasticity. As the rear pushing pieces 65 are pushed, the rear chair leg unit 60 is engaged and fixed on the rear connecting pipe bodies 132. Then, the user places the adjusted infant dining chair 100 on a required place for use. In one embodiment, when the front connecting pipe bodies 131 and the rear connecting pipe bodies 132 are pivoted and assembled on the first buckles 1331 and the second buckles 1334, the corresponding assembled front connecting pipe bodies 131 and rear connecting pipe bodies 132 are approximately located on the same line.

In summary, accroding to the design of the front chair leg adjusting units 30 and the rear chair leg adjusting units 50 of the improved structure of the infant dining chair 100 in the present invention, when a user wants to adjust the height of the infant dining chair 100, the user simply presses the front pushing pieces 45 pushed by the front elastic positioners 311 and the rear pushing pieces 65 pushed by the rear elastic positioners 511. The front elastic positioners 311 would not be engaged in the front height adjusting holes 43, and the rear elastic positioners 511 would not be engaged in the rear height adjusting holes 63 either. When the elastic positioners are adjusted to appropriate heights one by one, the front pushing pieces 45 and the rear pushing pieces 65 are released, so that the front elastic positioners 311 and the rear elastic positioners 511 are engaged in the corresponding front height adjusting holes 43 and rear height adjusting holes 63, which is convenient for the user to adjust the height of the infant dining chair 100. In one embodiment, the front connecting pipe bodies 131 and the rear connecting pipe bodies 132 may be unfolded in a way of being approximately parallel to the same axis, and therefore, the distance between the two opposite front connecting pipe bodies 131 may be increased, which improves the comfort level for infant to sit on the infant dining chair 100.

What is claimed is:

1. An improved infant dining chair provided for an infant to seat, the improved infant dining chair comprising:

a seat unit, including two chair leg connecting units pivoted on two sides of the seat unit, wherein each of the two chair leg connecting units includes a front connecting pipe body and a rear connecting pipe body, one end of the front connecting pipe body and one end of the rear connecting pipe body are pivoted to a pivoting member, the other end of the front connecting pipe body is provided with a front through hole, and the other end of the rear connecting pipe body is provided with a rear through hole;

a dining table unit, pivoted to the pivoting member of each of the two chair leg connecting units;

two front chair leg adjusting units, respectively connected to one end of the front connecting pipe body provided with the front through hole, wherein each of the two front chair leg adjusting units includes a front connecting piece sleeving an inner side wall of the end of the front connecting pipe body provided with the front through hole, and a front positioning elastic piece sleeving an inner side wall of the front connecting piece, and wherein a side wall of the front connecting piece is provided with a front elastic positioner and a front positioning hole located opposite to the front elastic positioner, one side of the front positioning elastic piece is abutted with the front elastic positioner correspondingly, and another side of the front positioning elastic piece is bent and includes a front limiting convex column engaged in the front positioning hole;

a front chair leg unit, provided with two front supporting pipe bodies respectively assembled on the front connecting piece correspondingly, wherein each of the two front supporting pipe bodies is provided with at least one front height adjusting hole;

two rear chair leg adjusting units, respectively connected to one end of the rear connecting pipe body provided with the rear through hole, wherein each of the two rear chair leg adjusting units includes a rear connecting piece sleeving an inner side wall of the end of the rear connecting pipe body provided with the rear through hole, and a rear positioning elastic piece sleeving an inner side wall of the rear connecting piece, and wherein a side wall of the rear connecting piece is provided with a rear elastic positioner and a rear positioning hole located opposite to the rear elastic positioner, one side of the rear positioning elastic piece is abutted with the rear elastic positioner correspondingly, and another side of the front positioning elastic piece is bent and includes a rear limiting convex column engaged in the rear positioning hole; and a rear chair leg unit, provided with two rear supporting pipe bodies respectively assembled on the rear connecting piece correspondingly, wherein each of the two rear supporting pipe bodies is provided with at least one rear height adjusting hole;

wherein each front elastic positioner is engaged in one of the at least one front height adjusting hole, and each rear elastic positioner is engaged in one of the at least one rear height adjusting hole.

2. The improved infant dining chair as claimed in claim 1, wherein each of the two front supporting pipe bodies is provided with a front positioning sliding chute on an inner side wall opposite to the at least one front height adjusting hole, and each of the two rear supporting pipe bodies is provided with a rear positioning sliding chute on an inner side wall opposite to the at least one rear height adjusting hole.

3. The improved infant dining chair as claimed in claim 1, wherein each front elastic positioner is convexly provided with a front positioning convex block, and each rear elastic positioner is convexly provided with a rear positioning convex block, and wherein the front positioning convex block is engaged in one of the at least one front height adjusting hole, and the rear positioning convex block is engaged in one of the at least one rear height adjusting hole.

4. The improved infant dining chair as claimed in claim 1, wherein each of the at least one front height adjusting hole is provided with a front pushing piece, and each of the at least one rear height adjusting hole is provided with a rear pushing piece.

5. The improved infant dining chair as claimed in claim 1, wherein a front leg seat is assembled between the front supporting pipe bodies, and a rear leg seat is assembled between the rear supporting pipe bodies.

6. The improved infant dining chair as claimed in claim 1, wherein the seat unit includes a seat and a backrest pivoted to one end of the seat, and the chair leg connecting units are respectively pivoted between the seat and the backrest.

7. The improved infant dining chair as claimed in claim 1, wherein the pivoting member includes a first buckle, a front connecting pipe pivot, a rear connecting pipe pivot and a second buckle, wherein one end of the front connecting pipe pivot is provided with a first pivoting through hole, one end of the rear connecting pipe pivot is provided with a pivoting axis parallel to an axial direction of the rear connecting pipe pivot and a second pivoting through hole penetrating through the pivoting axis, and wherein the second buckle penetrates into the second pivoting through hole and is assembled in the first pivoting through hole, and when the first buckle and the second buckle are assembled, the front connecting pipe pivot and the rear connecting pipe pivot are assembled between the first buckle and the second buckle.

8. The improved infant dining chair as claimed in claim 7, wherein each side of the dining table unit, which is pivoted to the pivoting member, is provided with a third pivoting through hole, and the third pivoting through hole is assembled in the rear connecting pipe pivot.

9. The improved infant dining chair as claimed in claim 8, wherein each third pivoting through hole is assembled between the second buckle and the front connecting pipe pivot.

* * * * *